United States Patent [19]
Crotty, III

[11] Patent Number: 5,765,898
[45] Date of Patent: Jun. 16, 1998

[54] VEHICLE SUNSHADE MOUNTING ASSEMBLY

[75] Inventor: Willard E. Crotty, III, Quincy, Mich.

[73] Assignee: Crotty Corporation, Quincy, Mich.

[21] Appl. No.: 729,667

[22] Filed: Oct. 4, 1996

[51] Int. Cl.$^6$ ............................................................. B60J 3/02
[52] U.S. Cl. .......................... 296/97.9; 296/97.5; 296/97.12
[58] Field of Search ................................ 296/97.1, 97.5, 296/97.9, 97.11, 97.12, 97.13

[56] References Cited

U.S. PATENT DOCUMENTS

| | | |
|---|---|---|
| 2,357,974 | 9/1944 | Roberts . |
| 2,634,191 | 4/1953 | Beets ............................ 296/87.11 |
| 2,681,824 | 6/1954 | Knoblock ....................... 296/97.9 |
| 2,917,186 | 12/1959 | Beets ........................... 296/97.13 X |
| 2,965,415 | 12/1960 | Dryden .......................... 296/97.13 |
| 3,017,217 | 1/1962 | Keating . |
| 3,074,756 | 1/1963 | Howe ............................ 296/97.13 |
| 3,809,428 | 5/1974 | Cohen ........................... 296/97.5 |
| 4,056,696 | 11/1977 | Meyerle et al. . |
| 4,178,035 | 12/1979 | Cziptschirsch . |
| 4,352,518 | 10/1982 | Prince et al. . |
| 4,377,020 | 3/1983 | Vigo . |
| 4,521,046 | 6/1985 | Foggini . |
| 4,529,157 | 7/1985 | Suman et al. . |
| 4,553,797 | 11/1985 | Marcus . |
| 4,569,552 | 2/1986 | Marks . |
| 4,634,196 | 1/1987 | Netstell . |
| 4,666,205 | 5/1987 | Nakagawa ........................ 296/97.9 X |
| 4,706,273 | 11/1987 | Spear et al. . |
| 4,729,590 | 3/1988 | Adams . |
| 4,756,570 | 7/1988 | Cooper . |
| 4,818,013 | 4/1989 | Van Order ....................... 296/97.13 |
| 4,893,866 | 1/1990 | Dowd et al. . |
| 4,902,068 | 2/1990 | Dowd et al. . |
| 4,913,484 | 4/1990 | Dowd et al. . |
| 4,989,911 | 2/1991 | Van Order . |
| 5,031,954 | 7/1991 | Perterson . |
| 5,042,867 | 8/1991 | Crotty, III et al. ................ 296/97.11 X |
| 5,061,005 | 10/1991 | Van Order . |
| 5,062,608 | 11/1991 | Phelps et al. . |
| 5,082,322 | 1/1992 | Cekander . |
| 5,098,151 | 3/1992 | Peterson . |
| 5,201,564 | 4/1993 | Price . |
| 5,213,389 | 5/1993 | Loftis et al. ..................... 296/97.9 X |
| 5,242,204 | 9/1993 | Kitterman . |
| 5,301,994 | 4/1994 | Wilson ........................... 296/97.5 X |
| 5,402,924 | 4/1995 | Gilson ........................... 296/97.5 X |
| 5,499,854 | 3/1996 | Crotty, III . |
| 5,544,927 | 8/1996 | Snyder et al. . |

FOREIGN PATENT DOCUMENTS 1251479  10/1971  United Kingdom .

*Primary Examiner*—Joseph D. Pape
*Attorney, Agent, or Firm*—Baker & Daniels

[57] ABSTRACT

The present invention involves a mounting assembly for use in a vehicle with a pre-existing primary sunshade assembly. The mounting assembly may provide support for an amenity such as a secondary sunshade. A secondary sunshade may be mounted in a position parallel to the windshield of the vehicle and, when the primary sunshade is positioned alongside a side window of the vehicle, the secondary sunshade can be tilted downward to shade the windshield. The mounting assembly includes a mounting block having an aperture into which a structural projection of the primary sunshade assembly is inserted and a set of pre-drilled holes forming a screw hole pattern which is alignable with the screw hole pattern of the primary sunshade mounting assembly. The mounting assembly may be used to retrofit a vehicle already having a primary sunshade by removing the primary sunshade, mating the block of the mounting assembly with the primary sunshade assembly, and attaching the two assemblies to the vehicle with elongate fasteners inserted through the aligned screw hole patterns. It would also be possible to use a sloped mounting block, with or without an amenity attached thereto, in conjunction with the primary sunshade assembly to alter the swing plane of the primary visor.

38 Claims, 6 Drawing Sheets

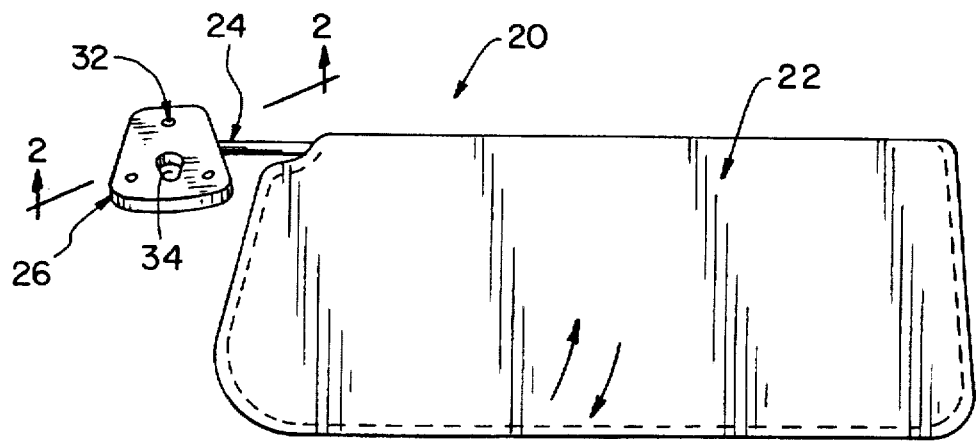
FIG. 1A
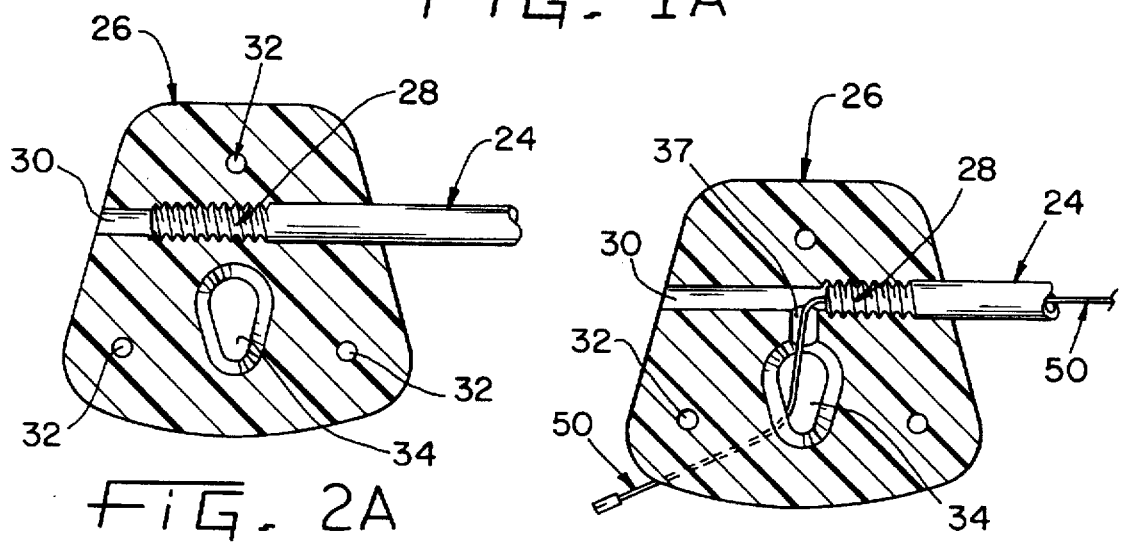
FIG. 2A
FIG. 2B
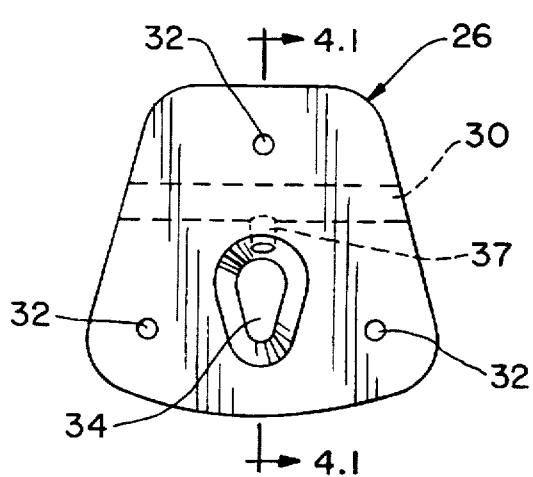
FIG. 3A
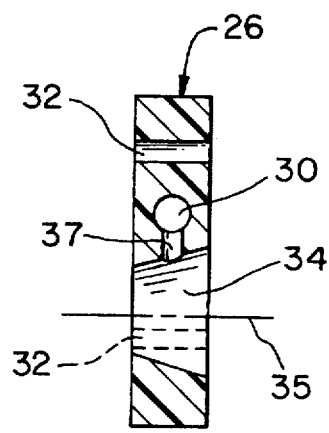
FIG. 4A

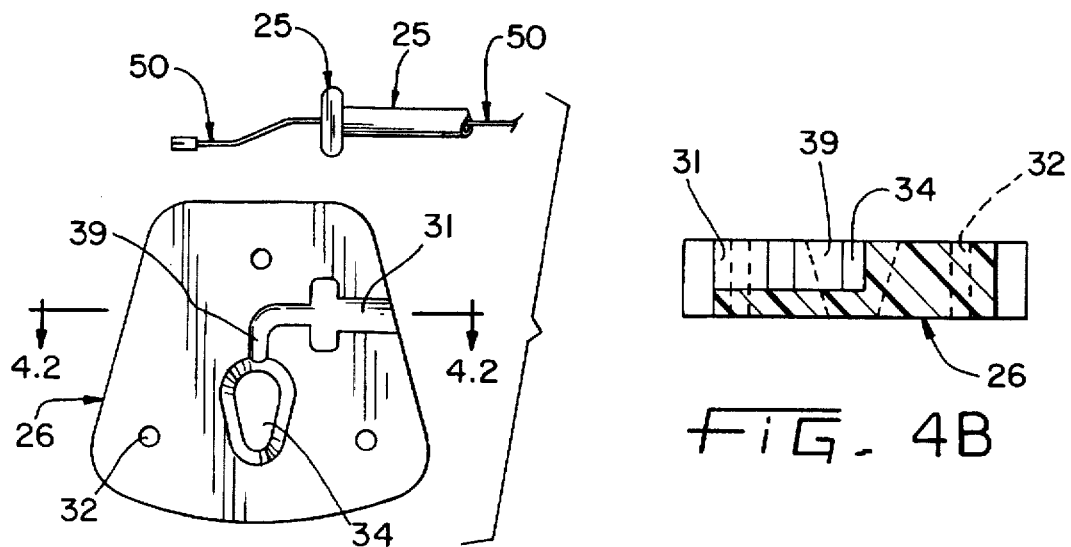
FIG. 3B
FIG. 4B
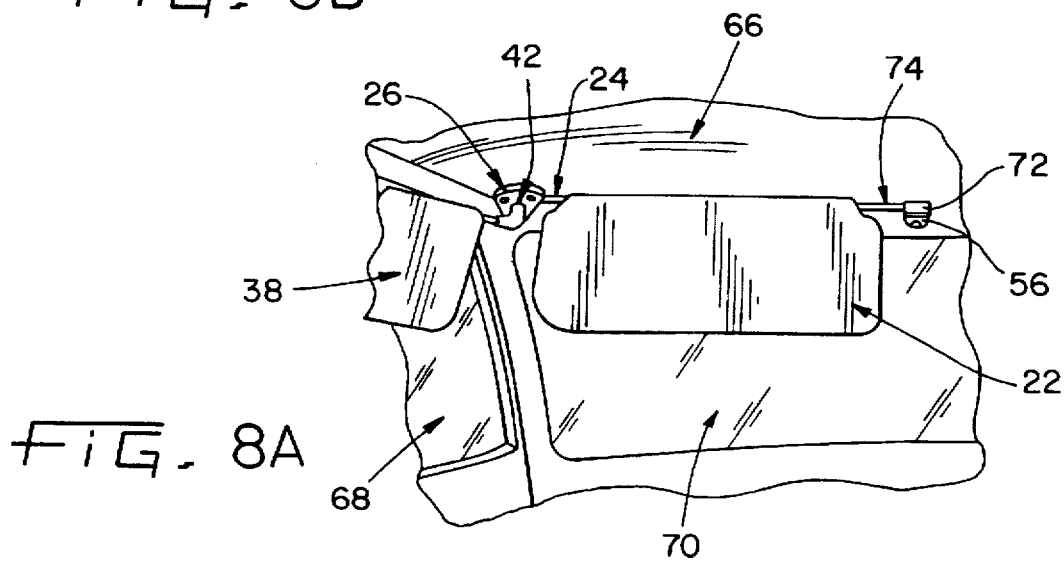
FIG. 8A
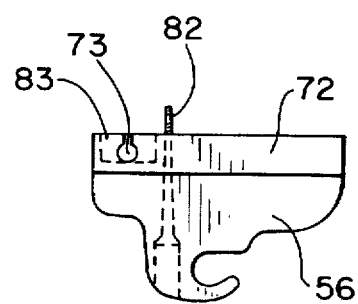
FIG. 8B
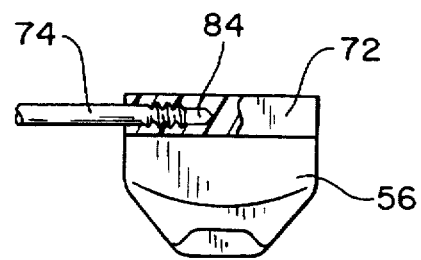
FIG. 8C

VEHICLE SUNSHADE MOUNTING ASSEMBLY

BACKGROUND OF THE INVENTION

1. Field of the Invention

The present invention relates generally to sunshades for vehicles, and, in particular, to a mounting assembly for use in a vehicle which already has a primary sunshade.

2. Description of the Related Art

Sunshades for vehicles are typically mounted near an upper corner of the vehicle interior near the intersection between the windshield and a side window of the vehicle. A primary sunshade is conventionally mounted so that it may be moved about two axes. The primary sunshade has a horizontal axis about which a visor blade may pivot between a storage position adjacent the vehicle headliner and a use position adjacent the windshield. The primary sunshade also typically has a vertical axis about which the visor may be rotated between a forward windshield position and a side window position.

It is often desirable to shade both the windshield and side window simultaneously. Vehicles are increasingly being manufactured with dual sunshades so that when the primary visor blade is rotated to a side window position a secondary visor blade may be used to shade the windshield. The secondary visor blade is generally positioned parallel to and alongside the windshield and can be rotated about a horizontal axis so that it can be tilted up and down but cannot be rotated around a vertical axis. The secondary sunshade is typically mounted on a support rod which is formed integrally with the mounting assembly of the primary sunshade.

Additional shading may also be required due to the limited size and positioning of the primary sunshade. A primary sunshade may not, in its original range of positions, accommodate all drivers.

The typical mounting assemblies and methods for secondary sunshades are not well suited for adding a secondary sunshade to a vehicle previously manufactured with only a single sunshade. Current mounting methods, such as using a support rod formed integrally with the mounting bracket of the primary sunshade, can require the installation of a completely new assembly including both a primary, as well as secondary sunshade, which is quite costly.

It is desirable to provide a secondary sunshade which can be easily and inexpensively installed in a vehicle previously manufactured with only a single sunshade and which minimizes the amount of additional hardware required to mount the secondary blade.

It is also desirable to provide a mounting assembly which may be used to alter the original swing plane of the primary visor blade.

SUMMARY OF THE INVENTION

The present invention provides a mounting assembly which may be installed in cooperation with a primary visor mounting bracket and thereby facilitate the installation of an amenity such as a secondary visor blade or to alter the swing plane of the primary visor. The mounting assembly and method are particularly well suited for installing a secondary sunshade in a previously manufactured vehicle having only a primary sunshade.

The invention comprises, in one form thereof, a mounting block with a support rod extending therefrom for supporting a visor blade or other amenity. The mounting block could also be sloped to alter the swing plane of the primary visor blade. The block has one or more apertures adapted for passage therethrough of the primary sunshade's support rod or other components which extend into the interior of the vehicle's frame. The block also has predrilled screw holes that match an existing primary hole pattern of the primary sunshade mounting means. Screws having a longer shaft are substituted for the original mounting screws and attach the primary and secondary sunshade to the vehicle.

The process of installing the mounting block is relatively simple. The original primary sunshade is detached by removing the attachment screws. The mounting block is mated with the primary sunshade's mounting bracket and the longer substituted screws are used to attach the primary mounting bracket and mounting block to the vehicle as a single unit.

A secondary sunshade or other amenity may be attached to the mounting block and installed therewith. In addition to reducing sun glare, the secondary sunshade can be the platform for furnishing a lighted vanity mirror, pocket, sleeve or other accessory not possessed by the primary sunshade.

The invention may comprise, in another form thereof, a mounting block having a sloped mounting surface. The block could be sloped so that when the primary mounting means is reattached to the interior of the vehicle, in cooperation with the mounting block, the swing angle of the primary visor blade is altered. The sloped block may have a secondary visor rod and blade which extends therefrom or be used by itself to alter the swing angle of the primary visor blade without adding a secondary visor blade.

An advantage of the present invention is that the aperture of the mounting block provides a passageway for wires necessary for the illumination of a vanity mirror located on either the primary or secondary sunshade.

Another advantage of the present invention is that it allows vehicles manufactured with a single sunshade to be retrofitted with a secondary sunshade thereby providing the ability to shade both the side window and the windshield simultaneously. Not only does this provide greater comfort to the vehicle occupants but it also improves the safety of the vehicle by reducing the chances of impaired vision due to sun glare.

Yet another advantage of the present invention is that a sloped mounting block could alter the swing angle of the primary visor to allow the primary visor to be positioned in a more preferable location. It is desirable to change the visor swing angle in certain vehicles in which the visor assumes an unacceptably high position when located adjacent to the side window. Additionally, the original positions of the primary visor blade even when suitable for the average driver are generally not suitable for drivers of all heights. By adjusting the swing angle with a sloped mounting block the primary visor blade can accommodate drivers who require or desire special positioning of the visor blade.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1A is a perspective view of the present invention;

FIG. 2A is a cross sectional view of the mounting block and support rod taken along section line 2—2 of FIG. 1;

FIG. 2B is a cross sectional view of a mounting block and hollow support rod taken along section line 2—2 of FIG. 1;

FIG. 3A is a top view of the mounting block of FIG. 2.1;

FIG. 3B is a top view of a mounting block and T-shaped support rod;

FIG. 4A is a cross sectional view of the mounting block of FIG. 3.1 taken along section line 4.1—4.1;

FIG. 4B is a cross sectional view of the mounting block of FIG. 3.2 taken along section line 4.2—4.2;

FIG. 8A is a diagrammatic view of the interior of a vehicle with a secondary visor having a center support block;

FIG. 8B is an elevational view of a center support block and a hook;

FIG. 8C is a partially cross-sectional view of a center support block and hook;

Figure 1B:
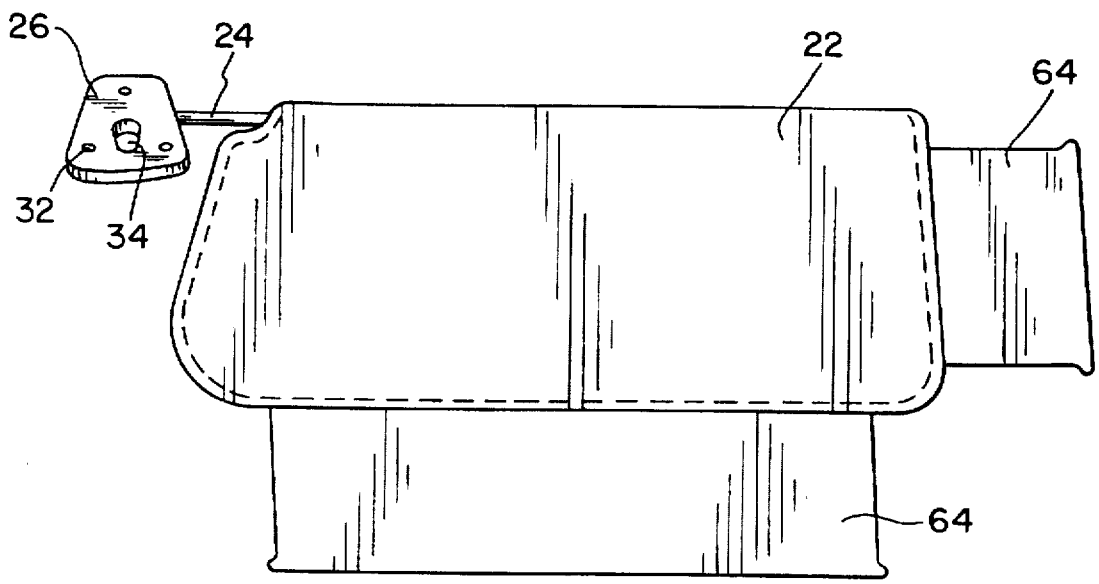
FIG. 1B is a perspective view of another embodiment of the present invention.

Corresponding reference characters indicate corresponding parts throughout the several views. Although the drawings represent various embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1C:
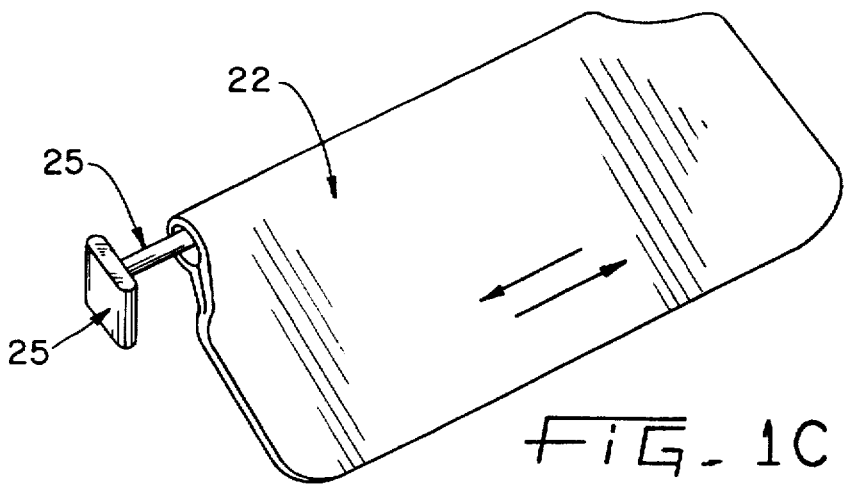
FIG. 1C is a perspective view of a visor and T-shaped support rod.
Figure 1D:
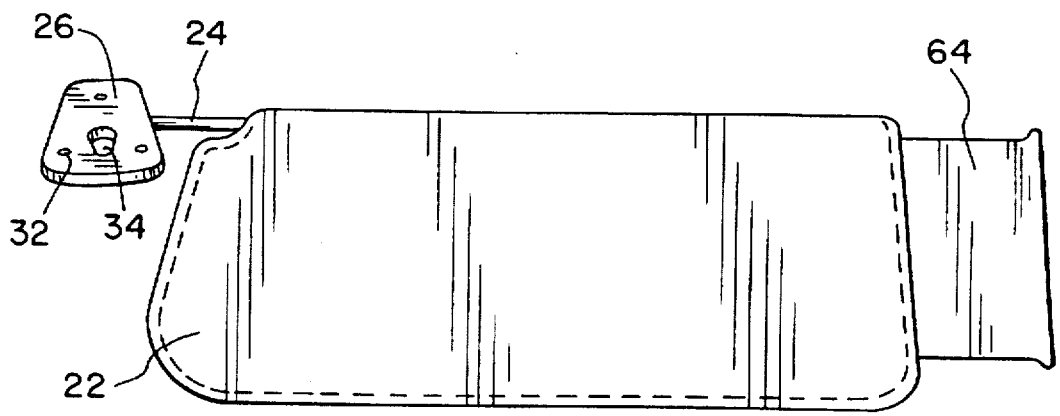
FIG. 1D is a perspective view of a visor.

A secondary sunshade 20 in accordance with one embodiment of the present invention is shown in FIG. 1. The secondary sunshade comprises a visor blade 22, a support rod 24 or 25 and a mounting block 26. The visor blade 22 may be rotated about the axis of the support rod 24, 25. Sufficient frictional resistance between the visor blade 22 and support rod 24, 25, created by methods well known in the art, maintains the visor blade 22 in a selected position relative to the support rod.

In one embodiment of the invention, a threaded support rod 24 has threads 28 on its end opposite the visor blade. The support rod threads 28 are used to attach the support rod 24 to the mounting block 26, as seen in FIG. 2 and 2.1. The support rod 24 is inserted into a pre-drilled transverse hole 30 located in the mounting block 26. The support rod 24 cannot be rotated relative to the axis 35 of central aperture 34 which is substantially perpendicular to the axis of the support rod 24. Thus, when the mounting block 26 is attached to a vehicle the visor blade 22 may only be tilted about the support rod 24. The mounting block also has a screw hole pattern formed by screw holes 32 and a central aperture 34 which matches a screw hole pattern of a primary mounting bracket 42.

Instead of threaded support rod 24, a T-shaped support rod or T-rod 25 may be fitted into a mounting block 26 having a T-shaped slot and is used to support the visor blade 22. As is evident from FIGS. 1.2 and 2.2, the T-rod may be slip fit within a T-slot 31 to secure the T-rod 25 to the mounting block 26.

The support rod 24 and T-rod 25 will generally consist of a solid metal rod, however, they may also be constructed of a hollow metal tube to permit the routing of wires from the vehicle frame to the visor blade 22. The support rod 24 and T-rod 25 could also be constructed of a solid or hollow plastic material or be formed integrally with the mounting block 26. The rods 24 and 25 may be straight, as shown in FIGS. 1 and 1.2, or they may require a bend to conform with the configuration of the vehicle interior and thereby place the secondary visor blade 22 in the desired position along the windshield and headliner.

The mounting block 26 may be constructed of any suitable material such as ABS (i.e., acrylonitrile butadiene styrene resin), nylon, zinc, and other thermal plastics and metals.

Figure 5:
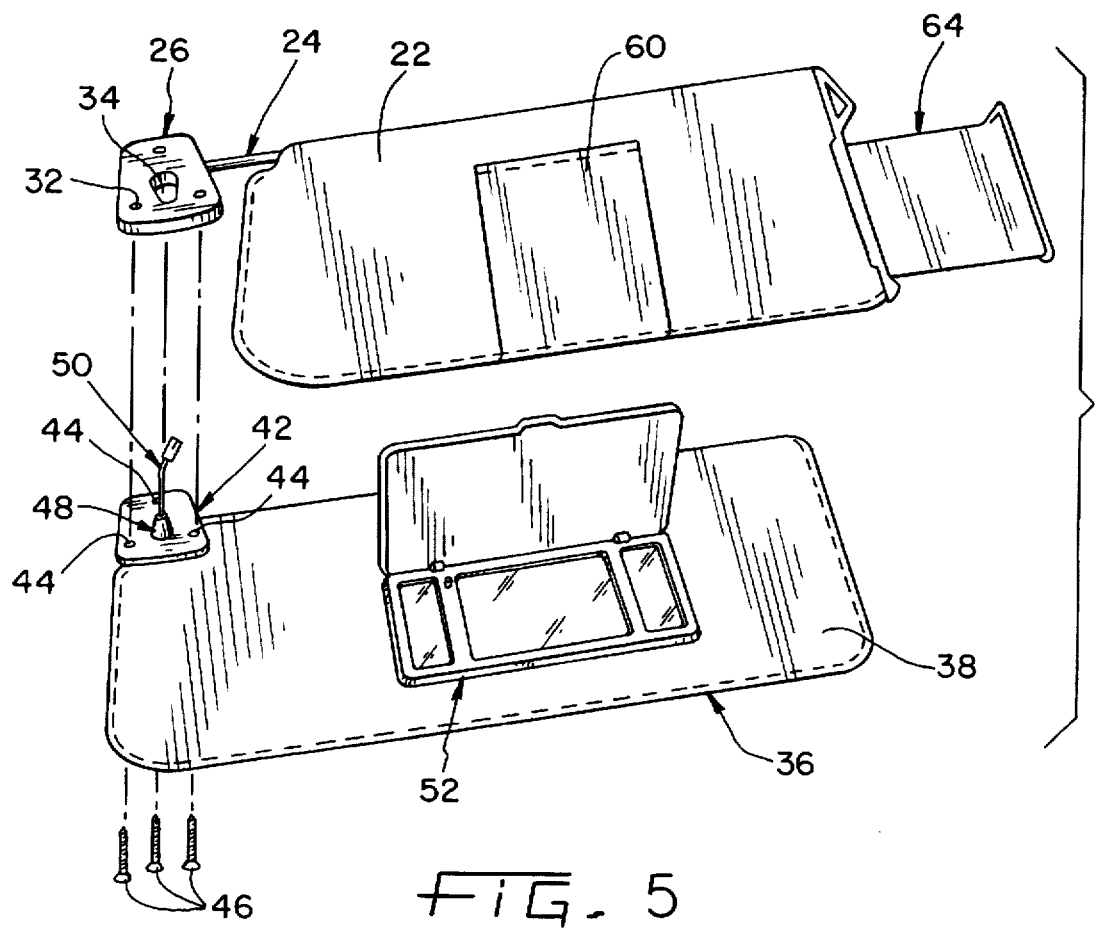
FIG. 5 is an exploded view of a primary and secondary sunshade and attachment screws.
Figure 6:
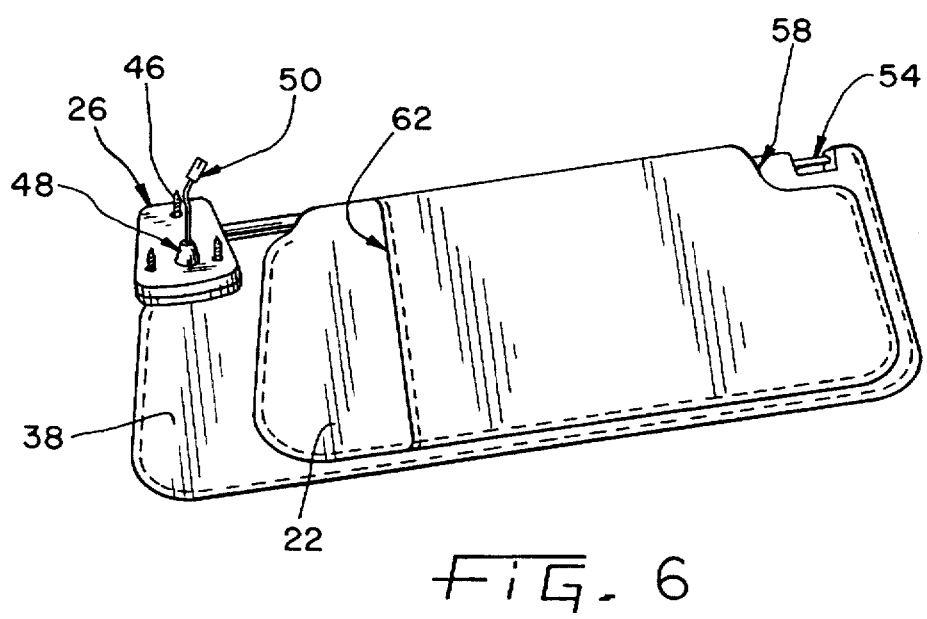
FIG. 6 is a view of a primary and secondary sunshade after they have been assembled.

The secondary sunshade is installed together with a primary sunshade 36 which comprises a primary visor blade 38, primary support rod 40 and a mounting bracket 42. As shown in the exploded view of FIG. 5, the screw hole pattern in the mounting block 26 is configured to correspond to the screw hole pattern in the mounting bracket 42 of the primary sunshade 36. When placed together, the screw holes 32 of the mounting block 26 align with mounting bracket screw holes 44 and allow mounting screws 46 to be inserted through both the mounting bracket 42 and mounting block 26. Also shown in FIGS. 5 and 6 is a structural projection 48 from which extends electrical wiring 50. The structural projection 48 encloses a portion of the primary support rod 40 and enables the primary sunshade 36 to be rotated about an axis which is roughly parallel to the axis of the central aperture 35. The electrical wiring 50 provides the circuitry necessary for an illuminated vanity mirror 52. The structural projection 48 fits within the central aperture 34 which may have slightly inclined walls, as shown in FIG. 4, to correspond to the shape of the structural projection 48. The central aperture 34 also permits passage of the electrical wiring 50.

The configuration of the screw hole pattern and the one or more apertures of the mounting block will be determined by the design of the mounting bracket 42 of the vehicle model for which the secondary sunshade 20 is intended.

Figure 10:
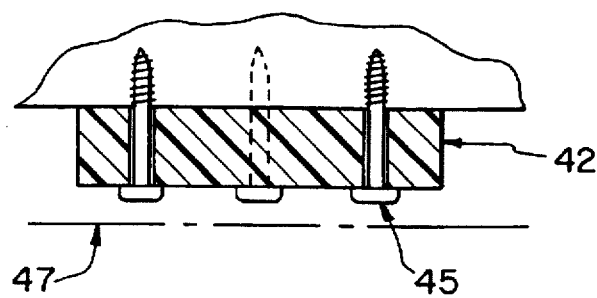
FIG. 10 is a cross sectional view of an installed primary sunshade mounting bracket.
Figure 11:
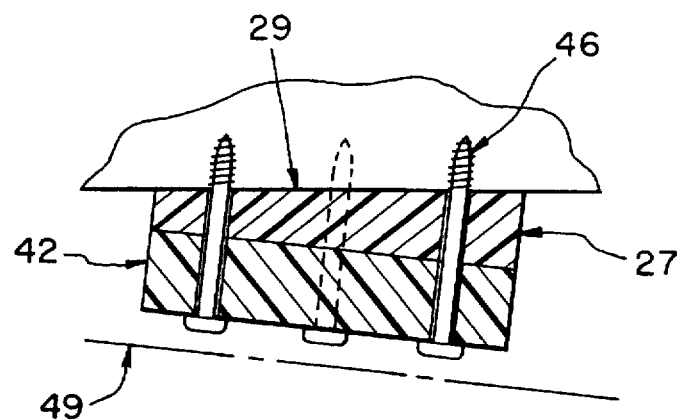
FIG. 11 is a cross sectional view of a primary sunshade mounting bracket installed in cooperation with a sloped mounting block.

A constant thickness mounting block 26, such as those illustrated in FIGS. 1–4, brings the swing plane of the primary visor blade 38 closer to the driver by the thickness of the mounting block 26 without changing the angle of the primary blade swing plane. A sloped mounting block 27, however, could be used to alter the angle of the primary visor blade's swing plane to adjust the positioning of the blade against the side window or windshield as shown in FIGS. 10 and 11. FIG. 10 illustrates a mounting bracket 42 of a primary visor blade in its original mounted position and a schematic representation of its original swing plane 47. FIG. 11 illustrates a sloped mounting block 27 which has two opposing sides 29 disposed at an angle to one another. Thus, when the mounting bracket 42 for the primary visor blade is reattached to the vehicle interior in cooperation with the sloped mounting block 27 the primary visor blade will have a modified swing plane 49. If the modified swing plane 49 intersects the original swing plane 47 at a point near the windshield, the primary visor would be able to assume its original position alongside the windshield and utilize the original hook 56. Although the original swing plane 47 is shown at a right angle to the original fasteners 45, the sloped mounting block 27 could also alter the swing plane of primary visor assemblies which have other swing plane orientations.

Figure 9:
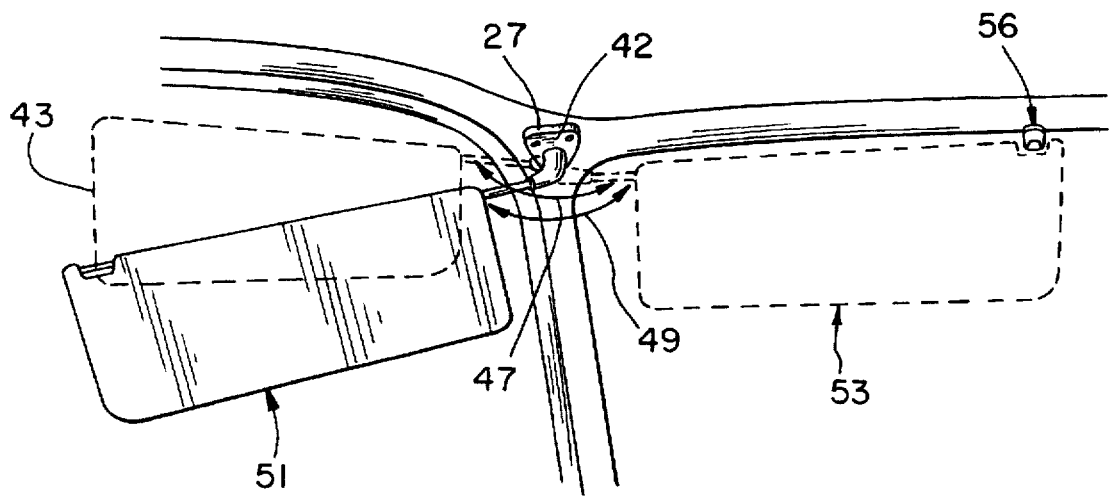
FIG. 9 is a diagrammatic view of the interior of a vehicle showing different swing planes of the primary sunshade assembly.

The sloped mounting block 27 and primary mounting bracket 42 are reattached to the vehicle interior with mounting screws 46. Although, for some vehicle models, the mounting screws 46 may engage the vehicle interior at a slightly different angle than the original mounting screws 45, mounting screws 46 will use the same screw pattern as the original mounting screws 45 and, thus, engage the threaded holes used by original screws 45 if the change in angle is not excessive. As shown in FIG. 9, the sloped mounting block 27 could be designed to produce a modified swing plane 49 which is lower along the side window than that of the original swing plane 47 and positions the primary visor blade 38 in approximately the same position as the original swing plane 47 when the visor blade is adjacent the windshield, as shown by the dashed outline 53. The modified lower position 51 alongside the side window and original side window position 43 are also displayed in FIG. 9. The sloped mounting block 27 could be used with an attached support rod and secondary visor blade 22 or by itself without a secondary visor blade or other amenity. A non-sloped mounting block 26 could also be used by itself without a secondary visor blade or other amenity to lower the swing plane of the visor by the thickness of the block 26 without altering the angle of the swing plane and could, if desired, provide a platform for electrical or communication connections.

Figure 7:
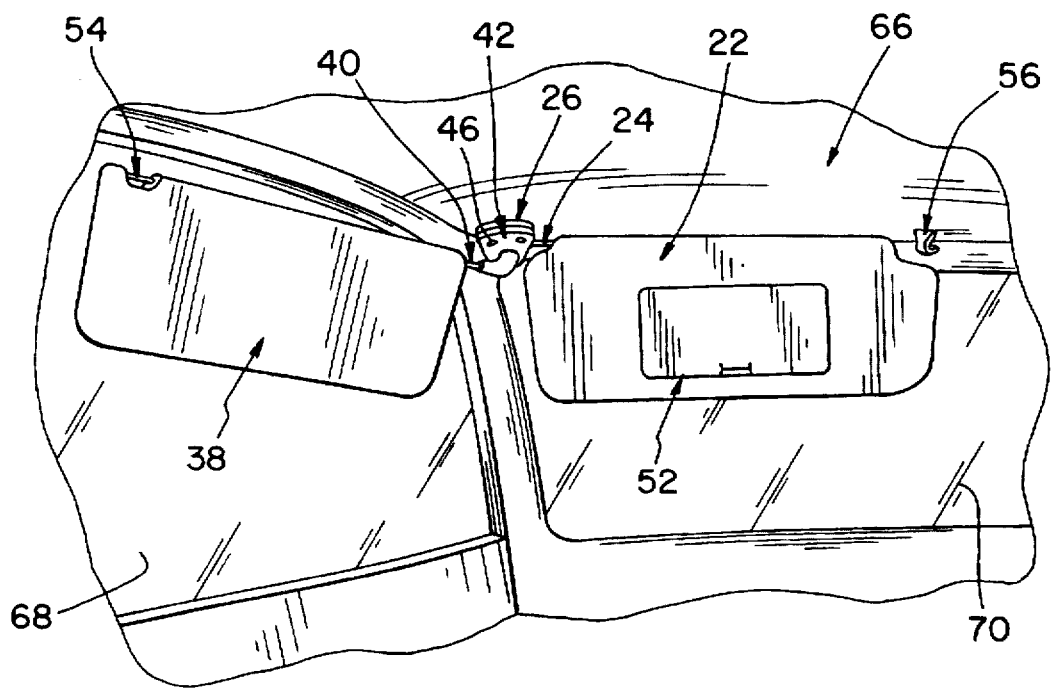
FIG. 7 is a diagrammatic view of the present invention installed in a vehicle.

The secondary visor blade 22 is configured to cooperate with the primary visor blade 38 of the vehicle model for which the secondary sunshade 20 is intended. As seen in FIGS. 6 and 7, for a primary visor blade 38 which has a pin 54 for the engagement of a hook 56 located on the vehicle interior, a cutout 58 is provided in the secondary visor blade 22 so that the hook 56 may still be used to engage the pin 54 and thereby support the primary visor blade 38. The secondary visor blade 22 has a length which conforms to that of the primary visor blade 38, as shown in FIG. 6. The support rod 24 or 25 may also extend through and beyond the secondary visor blade 22 as shown in FIG. 8. The extending portion 74 of the support rod may be secured to a center support block 72 in a manner similar to those used to attach the support rod to mounting block 26. The center support block 72 has an outer perimeter and screw hole pattern which is adapted to cooperate with the outer perimeter and screw hole pattern of the center hook 56. The center support block 72 does not, however, generally require an aperture 34. As shown in FIGS. 8, 8.1 and 8.2, center support block 72 could be mounted in cooperation with the hook 56 to the interior of the vehicle to provide additional support and rigidity to secondary visor blade 22. As shown in FIG. 8.1 a screw 82 having a longer length than the screw (or screws) originally securing the hook 56 to vehicle interior is used to secure the hook 56 and center support block 72 to the vehicle interior as a single unit.

Center support block 72 receives the extending portion 74 of the support rod which may have threads, a T-shaped end or some other suitable means to secure the rod to the center support block 72. The center support block 72 shown in FIG. 8.1 is adapted to receive a rod having T-shaped end and has a keyhole shaped slot 73 which terminates in a transverse slot 83 for receiving the T-shaped end of the rod. As shown in FIG. 8.2, the center support block 72 may also have a bore hole 84 drilled partially therethrough in which a threaded rod may be received.

Secondary visor blade 22 may utilize a conventional construction and be covered with a material such as cloth, plastic or vinyl having a color which will complement the decor of the vehicle. Translucent plastic materials could also be used in the construction of the visor blade 22. The visor blade 22 can function as a platform for a number of different accessories. For example, the visor blade 22 can be furnished with an elastic storage band 60 (FIG. 5), a pocket 62 (FIG. 6), one or more extendable inserts 64 (FIGS. 1.1, 1.3 and 5) or a vanity mirror 52 (FIG. 7). The storage band 60 is attached to the visor blade at opposite ends with stitching and consists of a suitable elastic material. The band allows papers or other items, such as maps or sunglasses, to be stored on the visor blade. The pocket 62 consists of a flap of material which forms a storage space between the flap and the visor blade 22. The material used to construct the pocket 62 is preferably the same as the material used to cover visor blade 22.

Extendable inserts 64 preferably consist of a plastic material and can be inserted into or extended from visor blade 22 at its end opposite the mounting block 26 or from the bottom lip of the visor blade 22 opposite the rod 24 as shown in FIG. 1.1. FIGS. 1.1, 1.3 and 5 show three separate embodiments of visor 22 having extendable inserts 64, which, when in an extended position increase the area shaded by the visor blade 22. The extendable insert 64 can be slid into the visor blade 22 and out of the way when it is not required.

It is also possible to slidably attach the entire visor blade 22 to the support rod 24, 25, to thereby allow the entire visor blade to slide on the support rod as illustrated by the arrows in FIG. 1.2. An illuminated vanity mirror 52 may also be furnished on the visor blade 22 as shown in FIG. 7. The necessary wiring 50 for vanity mirror 52 can be routed through a hollow support rod 24, 25. A wire hole 37 or groove 39 allows the wires to be routed from the hollow rod to the mounting block aperture, as shown in FIGS. 2.1 and 2.2. Although the FIGS. display a wire hole 37 used with a transverse hole 30 and a wire groove 39, which is connected with a T-slot 31, the wire groove 39 may be used with a transverse hole 30 and the wire hole 37 may be used with a T-slot 31. The wires are either threaded through wire hole 37 to be routed through the aperture 34 or slid into wire groove 39, which does not fully encircle the wires 50, and then through aperture 34.

The mounting block 26 or 27 could also be used as a platform for electrical connections. Power or communications cables could be routed from the interior structure of the vehicle to the mounting block where they could be connected to plugs located in the mounting block. The plugs would be accessible from the passenger compartment of the vehicle and allow for the connection of power cords or communication devices by occupants of the vehicle.

A support arm 76 could also be used with mounting block 26 or 27 to support amenities other than a visor blade. For example, a support arm 76 having a slight bend 78 near the mounting block 26 could extend along the side window to support a rewinding roller shade 80 or other amenity such as a curtain. The support arm 76 would support a roller shade 80 or curtain which extends for a greater distance from the front of the vehicle than the original visor blade 38 thereby providing additional shading. Such additional shading may be particularly beneficial when the driver's seat is located at its most rearward position. The roller shade or curtain would provide shading over a greater vertical range than the primary visor blade 38 and could even extend from the top to the bottom of the side window 68. The rewinding roller shade 80 would be constructed in a manner similar to the commonly available shades which utilize suction cups for attachment to side windows. The support arm 76, in contrast to suction cups, would support the rewinding roller shade 80 or other amenity while still permitting the side window 68 to be rolled up or down without interference. It would also be possible to mount a secondary visor blade on a support arm 76 which extends along the side window 68.

Figure 12:
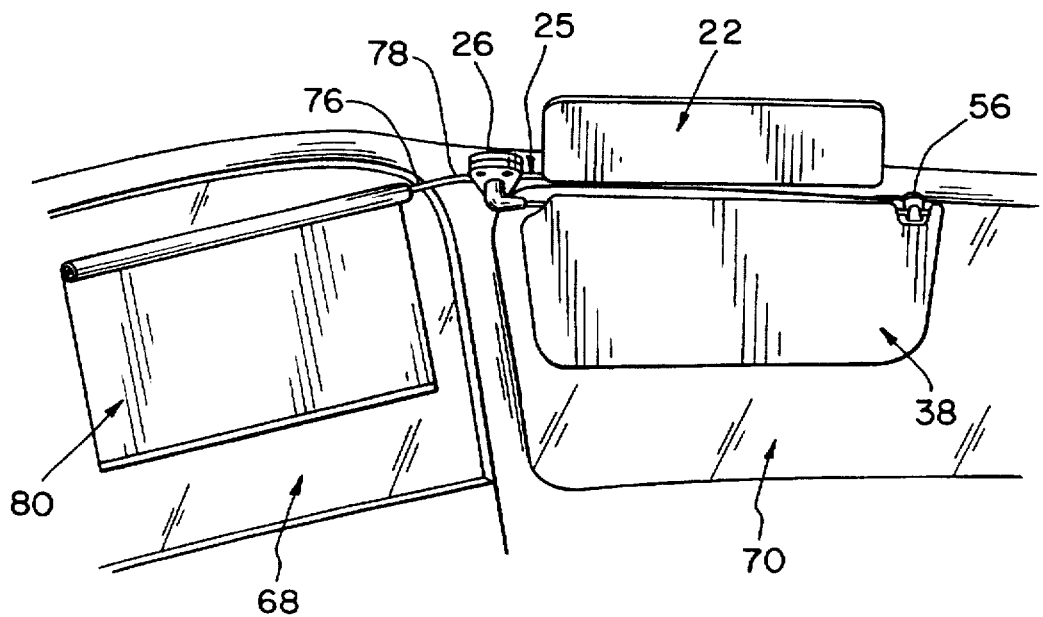
FIG. 12 is a diagrammatic view of the interior of a vehicle showing a mounting block having a side window support arm.

A mounting block 26 or 27 could also be used to support a plurality of supports, for example a T-rod 25 could be extended from the block along the windshield to support a secondary visor blade and a support arm 76 could extend from that same block along the side window to support an amenity such as a rewinding roller shade 80 as shown in FIG. 12. The support arm 76 would be attached to the mounting block 26 or 27 in any suitable manner such as slip-fitting a T-shaped end into the block or by engaging the block with threads.

The present invention also provides a method of installing a secondary sunshade 20 in a vehicle already having a primary sunshade 36. A secondary sunshade 20 can be easily installed in a vehicle already possessing a primary sunshade 36 secured to the vehicle by screws. The primary sunshade 36 is first removed from the vehicle by removing the original screws. Typically, the mounting bracket 42 of the primary sunshade 36 is secured to a sheet metal roof which is concealed by headliner 66. Conventional headliners 66 often comprise an exposed cushioned fabric material having a color appropriate for the vehicle interior.

An appropriate secondary sunshade 20 is then selected. The appropriate secondary sunshade 20 has a mounting block 26 with a screw pattern, exterior shape, and aperture 34 which will cooperate with the mounting bracket 42 of the primary sunshade 42. The appropriate visor blade 2.2 has a length roughly equivalent to that of the primary visor blade 38, a cutout 58, if required, and a color which will harmonize with the vehicle decor. The primary and secondary sunshades, 36 and 20, are then placed together as shown in FIG. 6. The matching screw patterns of the mounting block 26 and mounting bracket 42 are aligned and the structural projection 48 of the mounting bracket is fitted within the aperture 34. Mounting screws 46, which are longer than the original screws by approximately the thickness of the mounting block 26, are then used to fasten the primary and secondary sunshades, 36 and 20, to the vehicle as shown in FIG. 7.

When the secondary sunshade 20 has electrical wiring 50 which requires connection with the electrical circuitry of the vehicle, this connection is made prior to the installation of the sunshades to the vehicle with mounting screws 46. For primary sunshades having electrical wiring 50 running from the visor blade to the vehicle roof, the wiring 50 is disconnected when the primary sunshade is removed from the vehicle. The wires 50 are routed through either a wire hole 37 or wire groove 39 and the aperture 34 as the primary and secondary sunshades, 36 and 20, are placed together. The wires 50 are then reconnected to the vehicle circuitry immediately prior to the fastening of the sunshades to the vehicle by mounting screws 46. Power and communication plugs embedded in the block could be connected in a similar fashion.

FIG. 7 illustrates a secondary sunshade 20 of the present invention installed in a vehicle having a primary sunshade 36. The primary sunshade 36 is shown rotated about a vertical axis so that it is positioned next to the side window 68. The primary visor blade 38 has also been tilted downward about a horizontal axis defined by the primary support rod 40. The secondary sunshade 20 is shown running alongside the windshield 70 and is not rotatable about a vertical axis. The visor blade 22 is shown tilted downward about the support rod 24 to shade a portion of the windshield 70.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sunshade mounting device for installation in a vehicle, said vehicle including a primary sunshade assembly mounted therein with a fastener, said sunshade mounting device comprising:

a block adapted for installation between the vehicle and the primary sunshade assembly, said block consisting essentially of a plastic material and having first and second opposing surfaces, said first surface located adjacent to the vehicle when installed and said second surface located adjacent to the primary sunshade assembly when installed;

first means located on said block for cooperating with the primary sunshade assembly whereby said block and the primary sunshade assembly maybe fastened to the vehicle with at least one common fastener;

a support rod attached to said block and extending from an exterior edge of said block disposed between said first and second opposing surfaces, and a secondary visor blade disposed on said support rod.

2. The sunshade mounting device of claim 1 wherein said mounting block further comprises:

second means located on said block for adjusting a swing plane angle of the primary sunshade assembly.

3. A sunshade mounting device for installation in a vehicle, said vehicle including a primary sunshade assembly mounted therein with a fastener, said sunshade mounting device comprising:

a block adapted for installation between the vehicle and the primary sunshade assembly, first means located on said block for cooperating with the primary sunshade assembly whereby said block and the primary sunshade assembly maybe fastened to the vehicle with at least one common fastener; and a plurality of support means for supporting a corresponding plurality of amenities, said support means disposed on said block.

4. The sunshade mounting device of claim 3 wherein said plurality of amenities includes a secondary visor blade.

5. A sunshade mounting device for installation in a vehicle, said vehicle including a primary sunshade assembly mounted therein with a fastener, said sunshade mounting device comprising:
   a block adapted for installation between the vehicle and the primary sunshade assembly;
   first means located on said block for cooperating with the primary sunshade assembly whereby said block and the primary sunshade assembly maybe fastened to the vehicle with at least one common fastener; and
   a first and second opposing surface located on said block, said first and second surface being disposed at an angle, said first surface located adjacent to the vehicle when installed and said second surface located adjacent to the primary sunshade assembly when installed whereby a swing plane angle of the primary sunshade assembly is adjusted.

6. The sunshade mounting device of claim 5 wherein said first means comprises a hole which is adapted to cooperate with a fastener hole located in the said primary sunshade assembly, whereby said hole and the said fastener hole define an aligned hole through which a fastener may be inserted.

7. The sunshade mounting device of claim 6 further comprising support means connected to said block for supporting an amenity.

8. The sunshade mounting device of claim 7 wherein said amenity is a secondary sunshade.

9. A secondary sunshade assembly for installation in a vehicle, said vehicle including a primary sunshade assembly mounted therein with a fastener, said secondary sunshade assembly comprising:
   a visor blade;
   support means for supporting said visor blade; and
   mounting means consisting essentially of a plastic material, said mounting means having first and second opposing surfaces, said first surface located adjacent to the vehicle when installed and said second surface located adjacent to the primary sunshade assembly when installed, said support means attached to said mounting means whereby said support means extend from an exterior edge of said mounting means disposed between said first and second opposing surfaces, said mounting means having means for cooperating with the said primary sunshade assembly whereby said mounting means and the primary sunshade assembly maybe fastened to the vehicle with at least one common fastener.

10. The secondary sunshade assembly of claim 9 wherein said cooperating means comprises a hole which is adapted to cooperate with a fastener hole located in the said primary sunshade assembly, whereby said hole and the said fastener hole define an aligned hole through which the said fastener may be inserted.

11. The secondary sunshade assembly of claim 10 wherein said cooperating means is adapted for installation in a predetermined vehicle model.

12. The secondary sunshade assembly of claim 10 wherein said cooperating means further comprises an aperture adapted for cooperation with a structural projection of the said primary sunshade assembly.

13. The secondary sunshade assembly of claim 12 wherein said support means defines a first axis and said aperture has a second axis substantially perpendicular to said first axis; and
   wherein said visor blade may be tilted about said first axis and is fixed with respect to said second axis.

14. The secondary sunshade assembly of claim 9 wherein said support means comprises a rod threadingly engaging said mounting means.

15. The secondary sunshade assembly of claim 14 wherein said rod is a metal rod.

16. The secondary sunshade assembly of claim 14 wherein said rod is a plastic rod.

17. The secondary sunshade assembly of claim 14 wherein said rod is a hollow rod.

18. The secondary sunshade assembly of claim 9 wherein said support means comprises a hollow rod.

19. The secondary sunshade assembly of claim 9 wherein said mounting means comprises a mounting block.

20. The secondary sunshade assembly of claim 19 wherein said support means comprises a threaded rod which threadingly engages said mounting block.

21. The secondary sunshade assembly of claim 19 wherein said cooperating means comprises at least one hole in said mounting block which is adapted to cooperate with a fastener hole located in the said primary sunshade assembly, whereby said hole and the said fastener hole define an aligned hole through which the said fastener may be inserted.

22. The secondary sunshade assembly of claim 21 wherein said support means includes a rod threadingly engaging said mounting block.

23. The secondary sunshade assembly of claim 22 wherein said rod is a metal rod.

24. The secondary sunshade assembly of claim 22 wherein said rod is a plastic rod.

25. The secondary sunshade assembly of claim 9 wherein said visor blade further comprises a storage band.

26. The secondary sunshade assembly of claim 9 wherein said visor blade further comprises a storage pocket.

27. The secondary sunshade assembly of claim 9 wherein said visor blade further comprises a vanity mirror.

28. The secondary sunshade assembly of claim 9 wherein said visor blade further comprises an extendable insert.

29. The secondary sunshade assembly of claim 9 wherein said visor blade is slidably attached to said support means.

30. A secondary sunshade assembly for installation in a vehicle, said vehicle including a primary sunshade assembly mounted therein with a fastener, said secondary sunshade assembly comprising:
   a visor blade;
   a T-shaped rod which supports said visor blade; and
   a mounting block having a T-shaped slot, said T-shaped rod engaging said T-shaped slot whereby said T-shaped rod is attached to said mounting block, said mounting block having means for cooperating with the said primary sunshade assembly whereby said mounting block and the primary sunshade assembly maybe fastened to the vehicle with at least one common fastener.

31. The secondary sunshade assembly of claim 30 wherein said T-shaped rod is a plastic T-shaped rod.

32. The secondary sunshade assembly of claim 30 wherein said T-shaped rod is a metal T-shaped rod.

33. A secondary sunshade assembly for installation in a vehicle, said vehicle including a primary sunshade assembly mounted therein with a fastener, said secondary sunshade assembly comprising:

a visor blade:

a hollow rod supporting said visor blade:

a mounting block connected to said hollow rod, said mounting block having means for cooperating with the said primary sunshade assembly whereby said mounting means and the primary sunshade assembly maybe fastened to the vehicle with at least one common fastener: and a wire groove disposed on said mounting block for accepting wires from said hollow rod.

34. The secondary sunshade assembly of claim 33 wherein said visor blade further comprises a lighted vanity mirror.

35. A secondary sunshade assembly for installation in a vehicle, said vehicle including a primary sunshade assembly mounted therein with a fastener, said secondary sunshade assembly comprising:

a visor blade:

a T-shaped rod which supports said visor blade, and a mounting block having a T-shaped slot, said T-shaped rod engaging said T-shaped slot whereby said T-shaped rod is attached to said mounting block, said mounting block having at least one hole in said mounting block which is adapted to cooperate with a fastener hole located in the said primary sunshade assembly, whereby said hole and the said fastener hole define an aligned hole through which a fastener may be inserted and said mounting block and the primary sunshade assembly maybe fastened to the vehicle with said fastener.

36. The secondary sunshade assembly of claim 35 wherein said T-shaped rod is a metal T-shaped rod.

37. The secondary sunshade assembly of claim 35 wherein said T-shaped rod is a plastic T-shaped rod.

38. A secondary sunshade assembly for installation in a vehicle, said vehicle including a primary sunshade assembly mounted therein with a fastener, said secondary sunshade assembly comprising:

a visor blade, said visor blade having a lighted vanity mirror;

support means for supporting said visor blade, and mounting means connected to said support means, said mounting means having means for cooperating with the said primary sunshade assembly whereby said mounting means and the primary sunshade assembly maybe fastened to the vehicle with at least one common fastener.

* * * * *